United States Patent
Zheng et al.

(10) Patent No.: US 11,912,871 B2
(45) Date of Patent: Feb. 27, 2024

(54) AQUEOUS POLYMER DISPERSION AND PROCESS OF MAKING THE SAME

(71) Applicants: Dow Global Technologies LLC, Midland, MI (US); Rohm and Haas Company, Collegeville, PA (US)

(72) Inventors: Baoqing Zheng, Shanghai (CN); Yan Wu, Shanghai (CN); Jia Tang, Shanghai (CN); James C. Bohling, Lansdale, PA (US); Juan Zhao, Shanghai (CN); Yujiang Wang, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 645 days.

(21) Appl. No.: 17/251,843

(22) PCT Filed: Jul. 12, 2018

(86) PCT No.: PCT/CN2018/095384
§ 371 (c)(1),
(2) Date: Dec. 14, 2020

(87) PCT Pub. No.: WO2020/010564
PCT Pub. Date: Jan. 16, 2020

(65) Prior Publication Data
US 2021/0261779 A1    Aug. 26, 2021

(51) Int. Cl.
| | |
|---|---|
| *C08L 83/10* | (2006.01) |
| *C08F 2/26* | (2006.01) |
| *C08F 220/06* | (2006.01) |
| *C08F 220/14* | (2006.01) |
| *C08F 220/18* | (2006.01) |
| *C08F 230/02* | (2006.01) |
| *C08G 77/00* | (2006.01) |
| *C08G 77/16* | (2006.01) |
| *C08G 77/20* | (2006.01) |
| *C08G 77/44* | (2006.01) |
| *C08K 5/37* | (2006.01) |
| *C08L 25/14* | (2006.01) |
| *C09D 5/08* | (2006.01) |

(52) U.S. Cl.
CPC .............. *C08L 83/10* (2013.01); *C08F 2/26* (2013.01); *C08F 220/06* (2013.01); *C08F 220/14* (2013.01); *C08F 220/1804* (2020.02); *C08F 230/02* (2013.01); *C08G 77/16* (2013.01); *C08G 77/20* (2013.01); *C08G 77/44* (2013.01); *C08G 77/80* (2013.01); *C08K 5/37* (2013.01); *C08L 25/14* (2013.01); *C09D 5/08* (2013.01); *C08L 2201/50* (2013.01); *C08L 2201/52* (2013.01)

(58) Field of Classification Search
None
See application file for complete search history.

(56) References Cited

U.S. PATENT DOCUMENTS

| | | |
|---|---|---|
| 5,234,736 A | 8/1993 | Lee |
| 5,612,433 A | 3/1997 | Ono et al. |
| 6,756,459 B2 | 6/2004 | Larson et al. |
| 7,381,761 B2 | 6/2008 | Stark et al. |
| 2002/0058749 A1 | 5/2002 | Larson et al. |
| 2003/0224184 A1 | 12/2003 | Hermes et al. |
| 2006/0223911 A1 | 10/2006 | Bardman et al. |
| 2010/0041822 A1 | 2/2010 | Hashemzadeh |
| 2017/0058116 A1 | 3/2017 | Ando et al. |
| 2017/0058371 A1 | 3/2017 | Eryazici et al. |
| 2018/0298223 A1* | 10/2018 | Yang ............ C09D 15/00 |
| 2019/0292399 A1* | 9/2019 | Shu ............ C09D 5/028 |
| 2019/0345282 A1* | 11/2019 | Li ............ C09K 8/035 |
| 2020/0377627 A1* | 12/2020 | Lin ............ C08F 2/26 |

FOREIGN PATENT DOCUMENTS

| | | |
|---|---|---|
| CN | 105713496 A | 6/2016 |
| EP | 456346 | 11/1991 |
| JP | 2000186279 | 7/2000 |
| WO | 2017206162 A1 | 12/2017 |
| WO | 2018119721 A1 | 7/2018 |

OTHER PUBLICATIONS

Supplementary European Search Report for the corresponding European Application No. 18925877; Date of Completion: Jan. 12, 2022; 6 pages.

* cited by examiner

*Primary Examiner* — Robert S Loewe
(74) *Attorney, Agent, or Firm* — Susan M. Zerull

(57) ABSTRACT

An aqueous dispersion comprising a silicone-acrylic polymer with reduced coagulum, a process of preparing the aqueous dispersion, and an aqueous coating composition comprising the aqueous dispersion and providing coatings with improved corrosion resistance.

14 Claims, No Drawings

AQUEOUS POLYMER DISPERSION AND PROCESS OF MAKING THE SAME

FIELD OF THE INVENTION

The present invention relates to an aqueous polymer dispersion and a process of making the same.

INTRODUCTION

Solvent borne coating compositions comprising epoxy resins, polyurethane, or alkyd resins are widely used in metal protective coatings due to their anti-corrosion performance, mechanical properties and appearance. Waterborne acrylic polymer dispersions have much less environmental concerns than solvent borne dispersions and are usually used for light to medium duty metal protection.

U.S. Pat. No. 6,756,459 B2 discloses an aqueous emulsion copolymer comprising as polymerized units, 55-58% of styrene, 35-37% of 2-ethylhexyl acrylate, 2.5-3% of methyl methacrylate, 2.5-3% of phosphoethyl methacrylate, 0-3.5% of 2-(acetoacetoxy)ethyl methacrylate, and 0-0.25% of methacryloxypropyltrimethoxysilane. Such aqueous emulsion copolymer can provide coatings with improved gloss and corrosion resistance when applied to metal substrates, for example, exhibiting no greater than 20% rust or a blister rating no greater than "M" after at least 7 days of exposure to salt spray according to ASTM B-117-97. For some coating applications, such as general industrial finishes and agriculture construction equipment coatings, it requires coatings with even better anti-corrosion performance to sustain at least 240 hours salt-spray testing at a dry film thickness of about 40~80 μm.

Incorporation of more hydrophobic monomers such as (meth)acrylate functional siloxanes into the polymer backbone during emulsion polymerization can be one approach to further improve anti-corrosion performance, but often forms polymers having a large amount of coagulum.

Therefore, it is desirable to provide an aqueous polymer dispersion with reduced coagulum formed in polymerization, which can provide coatings with the above-described anti-corrosion property.

SUMMARY OF THE INVENTION

The present invention provides a novel aqueous dispersion with a low coagulum content, particularly useful as a binder in coating applications, comprising a silicone-acrylic polymer. The silicone-acrylic polymer comprises structural units of a specific (meth)acrylate functional siloxane and residues of a specific alkyl thiol at a weight ratio smaller than 5.0. "Low coagulum content" means a coagulum content of an aqueous dispersion less than 200 ppm after sieving with 100 mesh (149 μm) and 325 mesh (44 μm), respectively. The aqueous coating composition comprising the aqueous dispersion of the present invention can provide coatings with improved corrosion resistance property, that is, the coatings with a thickness of 40-80 μm exhibit surface rusted rating >5 and blister rating of M or better, after at least 48 hours of exposure to salt spray. Coagulum content and corrosion resistance properties can be measured according to the test methods described in the Examples section.

In a first aspect, the present invention is an aqueous dispersion comprising a silicone-acrylic polymer with a number average molecular weight of from 5,000 to 50,000 g/mol, wherein the silicone-acrylic polymer comprises, based on the weight of the silicone-acrylic polymer, (a) from 0.1% to 6.5% by weight of structural units of a (meth)acrylate functional siloxane having the structure of formula (I),

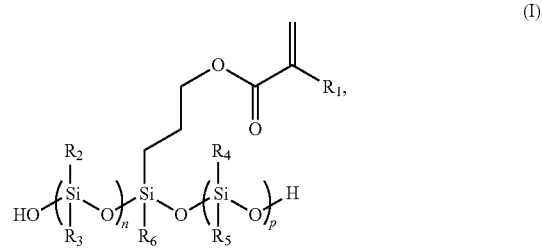

wherein $R_1$ is hydrogen or a methyl group, $R_2$, $R_3$, $R_4$, $R_5$ and $R_6$ are each independently selected from the group consisting of methyl, ethyl and benzyl groups, n is an integer of from 0 to 20, p is an integer of from 0 to 20, provided that n+p>5;

(b) from 0.1% to 4.5% by weight of structural units of an ionic monomer;

(c) from 30% to 75% by weight of structural units of a hard monomer; and (d) from 20% to 65% by weight of structural units of a soft monomer;

wherein the silicone-acrylic polymer comprises residues of an alkyl thiol containing a $C_6$-$C_{24}$ alkyl or a substituted $C_6$-$C_{24}$ alkyl; and wherein the weight ratio of structural units of the (meth)acrylate functional siloxane to residues of the alkyl thiol is less than 5.0.

In a second aspect, the present invention is a process of preparing an aqueous dispersion comprising a silicone-acrylic polymer with a number average molecular weight of from 5,000 to 50,000 g/mol by free-radical polymerization, comprising: polymerization of a monomer mixture in an aqueous medium in the presence of an alkyl thiol containing a $C_6$-$C_{24}$ alkyl group or a substituted $C_6$-$C_{24}$ alkyl group;

wherein the monomer mixture comprises, based on the total weight of the monomer mixture, (a) from 0.1% to 6.5% by weight of a (meth)acrylate functional siloxane having the structure of formula (I),

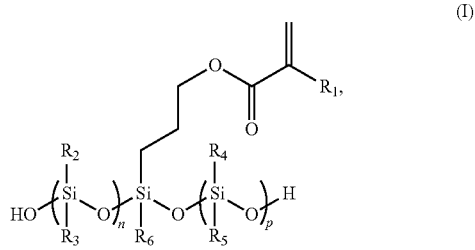

wherein $R_1$ is hydrogen or a methyl group, $R_2$, $R_3$, $R_4$, $R_5$ and $R_6$ are each independently selected from the group consisting of methyl, ethyl and benzyl groups, n is an integer in the range of from 0 to 20, p is an integer in the range of from 0 to 20, provided that n+p>5;

(b) from 0.1% to 4.5% by weight of an ionic monomer;

(c) from 30% to 75% by weight of a hard monomer; and (d) from 20% to 65% by weight of a soft monomer;

wherein the silicone-acrylic polymer comprises residues of the alkyl thiol; and wherein the weight ratio of structural units of the (meth) acrylate functional siloxane to residues of the alkyl thiol is less than 5.0.

In a third aspect, the present invention is an aqueous coating composition comprising the aqueous dispersion of the first aspect.

DETAILED DESCRIPTION OF THE INVENTION

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth) acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" as used herein can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

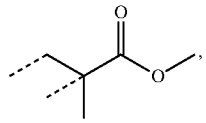

where the dotted lines represent the points of attachment of the structural unit to the polymer backbone.

"Alkyl" herein refers to a linear or branched alkyl group including a cycloalkyl group.

The aqueous dispersion of the present invention comprises one or more silicone-acrylic polymers. The silicone-acrylic polymer comprises structural units of one or more (meth)acrylate functional siloxanes. The (meth)acrylate functional siloxanes may have the structure of formula (I),

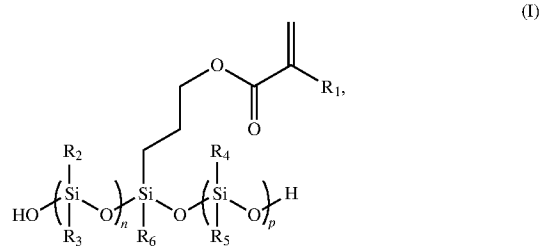

wherein $R_1$ is hydrogen or a methyl group; $R_2$, $R_3$, $R_4$, $R_5$ and $R_6$ are each independently selected from the group consisting of methyl, ethyl and benzyl groups; n and p are each independently an integer of 0 or more, 4 or more, 6 or more, 7 or more, or even 8 or more, and at the same time, 20 or less, 18 or less, 16 or less, 14 or less, or even 12 or less. The value of n+p is larger than 5, for example, in the range of from 6 to 40, from 10 to 36, from 14 to 32, from 16 to 30, or from 18 to 28. Preferably, each of $R_2$, $R_3$, $R_4$, $R_5$ and $R_6$ is a methyl group. The silicone-acrylic polymer may comprise, by weight based on the weight of the silicone-acrylic polymer, 0.1% or more, 0.4% or more, 0.7% or more, 1.0% or more, 1.3% or more, or even 1.5% or more, and at the same time, 6.5% or less, 6% or less, 5.5% or less, 5% or less, 4.5% or less, 4% or less, 3.5% or less, 3% or less, or even 2.5% or less, of structural units of the (meth)acrylate functional siloxane. "Weight of the silicone-acrylic polymer" refers to the dry or solids weight of the silicone-acrylic polymer.

The silicone-acrylic polymer in the aqueous dispersion may also comprise structural units of one or more ionic monomers, typically ethylenically unsaturated ionic monomers. "Ionic monomers" herein refer to monomers that bear an ionic charge between pH=1-14. The ionic monomers may include α, β-ethylenically unsaturated carboxylic acids including, for example, methacrylic acid, acrylic acid, itaconic acid, maleic acid, crotonic acid, acryloxypropionic acid, or fumaric acid, 2-carboxyethyl (meth)acrylate; a monomer bearing an acid-forming group which yields or is subsequently convertible to, such an acid group (such as anhydride, (meth)acrylic anhydride, or maleic anhydride); sodium styrene sulfonate (SSS); sodium vinyl sulfonate (SVS); acrylamido-2-methylpropanesulfonic acid (AMPS); phosphorous-containing acid monomers including phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R^1)-C(O)-O-(R^2O)_q-P(O)(OH)_2$, wherein $R^1=H$ or $CH_3$, $R^2$=alkyl, and q=1-20, such as SIPOMER PAM-100, SIPOMER PAM-200, SIPOMER PAM-300 and SIPOMER PAM-600 all available from Solvay; phosphoalkoxy (meth) acrylates such as phospho ethylene glycol (meth)acrylate, phospho di-ethylene glycol (meth)acrylate, phospho tri-ethylene glycol (meth)acrylate, phospho propylene glycol (meth)acrylate, phospho dipropylene glycol (meth)acrylate, phospho tri-propylene glycol (meth)acrylate; salts thereof; and mixtures thereof. Preferred ionic monomers include acrylic acid, methyl acrylic acid, itaconic acid, phosphoethyl (meth)acrylate; salts thereof; and mixtures thereof. The silicone-acrylic polymer may comprise, by weight based on the weight of the silicone-acrylic polymer, 0.1% or more, 0.3% or more, 0.5% or more, 0.7% or more, 1.0% or more, 1.2% or more, or even 1.3% or more, and at the same time, 4.5% or less, 4.0% or less, 3.5% or less, 3% or less, 2.5% or less, 2.0% or less, 1.8% or less, or even 1.6% or less, of structural units of the ionic monomer.

The silicone-acrylic polymer in the aqueous dispersion may also comprise structural units of one or more soft monomers. As used herein, the term "soft monomers" refers to a compound that excludes the ionic monomers described above, whose homopolymer has a $T_g$<25° C., for example, 20° C. or lower, 15° C. or lower, 5° C. or lower, 0° C. or lower, −5° C. or lower, −15° C. or lower, or even −30° C. or lower. Examples of suitable soft monomers include methyl acrylate, ethyl acrylate, butyl (meth)acrylate, n-decyl (meth)acrylate, 2-ethylhexyl (meth)acrylate, lauryl (meth)acrylate, stearyl (meth)acrylate, and mixtures thereof. Preferred soft monomers include methyl acrylate, butyl acrylate, 2-ethylhexyl acrylate, 2-ethylhexyl methacrylate, and mixtures thereof. The silicone-acrylic polymer may comprise, by weight based on the weight of the silicone-acrylic polymer, 20% or more, 25% or more, 30% or more, 34% or more, 38% or more, 42% or more, 45% or more, or even 47% or more, at the same time, 65% or less, 64% or less, 62% or less, 60% or less, 58% or less, 54% or less, or even 52% or less, of structural units of the soft monomer.

The silicone-acrylic polymer in the aqueous polymer dispersion may further comprise structural units of one or more hard monomers. As used herein, the term "hard monomers" refers to a compound that excludes the ionic monomers described above, whose homopolymer has a Tg≥25° C. The Tg of the hard monomers may be 25° C. or higher, 30° C. or higher, 35° C. or higher, or even 40° C. or higher. Examples of suitable hard monomers include styrene, substituted styrene including, for example, butylstryene, methylstyrene, and p-methoxystyrene; methyl methacrylate, tert-butyl acrylate, tert-butyl methacrylate, acrylamide, methacrylamide, ethyl methacrylate, 2-hydroxyl methacrylate, (meth) acrylonitrile, cyclohexyl (meth) acrylate, methylcyclohexyl acrylate, isobornyl methacrylate, isobornyl acrylate, dihydrodicyclopentadienyl acrylate, and mixtures thereof. Preferred hard monomers include methyl methacrylate, cyclohexyl (meth)acrylate, styrene, and mixtures thereof. The silicone-acrylic polymer may comprise, by weight based on the weight of the silicone-acrylic polymer, 30% or more, 35% or more, 40% or more, 44% or more, 47% or more, or even 50% or more, at the same time, 75% or less, 70% or less, 66% or less, 62% or less, 59% or less, 56% or less, or even 54% or less, of structural units of the hard monomer.

The silicone-acrylic polymer in the aqueous dispersion may optionally comprise up to 2% of structural unis of one or more ethylenically unsaturated monomers carrying at least one functional group selected from the group consisting of carbonyl, ureido, urea and alkoxysilane. Examples of suitable functional-group-containing monomers include diacetone acrylamide (DAAM), acetoacetoxyethyl (meth) acrylate, acetoacetoxypropyl (meth)acrylate, acetoacetoxybutyl (meth)acrylate, 2,3-di(acetoacetoxy) propyl (meth) acrylate, allyl acetoacetates, vinyl acetoacetates, acetoacetamides, vinyl trimethoxyl silane, 3-methacryloxypropyltrimethoxysilane, vinylphenyl trimethoxy silane, acryloyloxypropyl triethoxysilane, vinyl triethoxysilane, vinyl methyl dimethoxy silane, and mixtures thereof. Examples of monomers with urea and/or ureido functional groups include,

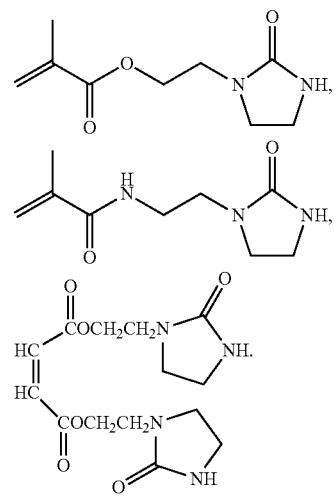

The silicone-acrylic polymer may comprise, by weight based on the weight of the silicone-acrylic polymer, from zero to 2%, from 0.1% to 1.5%, or from 0.2% to 1%, of structural units of the functional-group-containing ethylenically unsaturated monomer.

The silicone-acrylic polymer in the aqueous dispersion may further comprise structural units of one or more multi-ethylenically unsaturated monomers. Examples of suitable multi-ethylenically unsaturated monomers include allyl (meth)acrylate, hexanediol di(meth)acrylate, ethylene glycol di(meth)acrylate, neopentyl glycol di(meth)acrylate, butanediol di(meth)acrylate, trimethylolpropane tri(meth) acrylate, divinyl benzene, allyl acetate, allyl (meth)acrylamide, allyl oxyethyl (meth)acrylate, crotyl (meth)acrylate, dicyclopentenyl (meth)acrylate, dicyclopentenyl ethyl (meth)acrylate, diallyl maleate, and mixtures thereof. The silicone-acrylic polymer may comprise, by weight based on the weight of the silicone-acrylic polymer, from zero to 5%, from 0.1% to 2%, or from 0.3% to 1%, of structural units of the multi-ethylenically unsaturated monomer.

The silicone-acrylic polymer in the aqueous dispersion comprises residues of one or more alkyl thiols. "Residues" refers to the remnant of the alkyl thiol after polymerization by the removal of one hydrogen atom from the thiol group. For example, residues of n-dodecyl mercaptan is as illustrated:

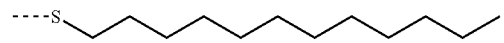

where the dotted lines represent the points of attachment of the residues to the polymer backbone.

The alkyl thiol useful in the present invention may have the structure of R'—SH, wherein R' is a $C_6$-$C_{24}$ alkyl group or a substituted $C_6$-$C_{24}$ alkyl group. R' can be a $C_6$-$C_{24}$ alkyl, $C_7$-$C_{20}$ alkyl, $C_8$-$C_{18}$ alkyl, $C_9$-$C_{16}$ alkyl, $C_{10}$-$C_{14}$ alkyl, or $C_{11}$-$C_{12}$ alkyl group, which is optionally substituted by R"O—, R"CO—, R"COO—, R"CONH—, where each R" is independently a $C_1$-$C_{12}$ alkyl, a $C_1$-$C_{10}$ alkyl, a $C_1$-$C_8$ alkyl, a $C_1$-$C_6$ alkyl, or a $C_1$-$C_2$ alkyl.

Suitable alkyl thiols may include, for example, n-dodecyl mercaptan, cetyl mercaptan, octadecanethiol, octyl mercaptan, hexanethiol, decanethiol, and mixtures thereof. The alkyl thiols may be used, by weight based on the total weight of monomers described above in an amount sufficient to afford the weight ratio of structural units of the (meth) acrylate functional siloxane to residues of the alkyl thiol less than 5.0 (<5.0), for example, 4.9 or less, 4.7 or less, 4.5 or less, 4.3 or less, 4.1 or less, 3.9 or less, 3.7 or less, 3.5 or less, 3.3 or less, 3.1 or less, 3.0 or less, 2.8 or less, 2.6 or less, 2.5 or less, or even 2.4 or less. For example, the alkyl thiol may be used, by weight based on the total weight of monomers, in an amount of from 0.1% to 3%, from 0.5% to 2.5%, or from 0.8% to 2.0%.

In some embodiments, the silicone-acrylic polymer in the aqueous dispersion of the present invention comprises, by weight based on the weight of the silicone-acrylic polymer,
 (a) from 1% to 3% of structural units of the (meth)acrylate functional siloxane;
 (b) from 1% to 3.5% of structural units of the ionic monomer such as acrylic acid, methyl acrylic acid, phosphoethyl (meth)acrylate, and mixtures thereof;
 (c) from 35% to 70% of structural units of the hard monomer such as methyl methacrylate, styrene, cyclohexyl (meth)acrylate, and mixtures thereof; and
 (d) from 25% to 60% of structural units of the soft monomer such as butyl acrylate, 2-ethylhexyl acrylate, 2-ethylhexyl methacrylate, and mixtures thereof; and
 wherein the weight ratio of structural units of the (meth) acrylate functional siloxane to residues of the alkyl thiol is 3.5 or less.

The types and levels of the monomers described above may be chosen to provide the silicone-acrylic polymer with a Tg suitable for different applications. The Tg of the silicone-acrylic polymer may be in the range of from −20 to 50° C., from −10 to 40° C., from 0 to 35° C., or from 10 to 30° C.

The silicone-acrylic polymer in the aqueous dispersion may have a number average molecular weight ($M_n$) of 5,000 grams per mole (g/mol) or more, 5,500 g/mol or more, 6,000 g/mol or more, 6,500 g/mol or more, 7,000 g/mol or more, 7,500 g/mol or more, 8,000 g/mol or more, 8,500 g/mol or more, 9,000 g/mol or more, or even 9,500 g/mol or more, and at the same time, 50,000 g/mol or less, 45,000 g/mol or less, 40,000 g/mol or less, 35,000 g/mol or less, 30,000 g/mol or less, 25,000 g/mol or less, 20,000 g/mol or less, 15,000 g/mol or less, 12,500 g/mol or less, 12,000 g/mol or less, or even 11,500 g/mol or less. $M_n$ may be determined by Gel Permeation Chromatography (GPC) analysis as described in the Examples section below.

The silicone-acrylic polymer in the aqueous dispersion may be prepared by free-radical polymerization, preferably emulsion polymerization, of the monomers described above, in the presence of one or more alkyl thiols. In the polymerization process of preparing the silicone-acrylic polymer, total weight concentration of the monomers for preparing the silicone-acrylic polymer is equal to 100%. A mixture of the monomers may be added neat or as an emulsion in water; or added in one or more additions or continuously, linearly or nonlinearly, over the reaction period of preparing the silicone-acrylic polymer. Temperature suitable for emulsion polymerization processes may be lower than 100° C., in the range of from 0 to 95° C., or in the range of from 50 to 90° C.

In the polymerization process of preparing the silicone-acrylic polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of from 0.01% to 1%, or from 0.05% to 0.6%, by weight based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the silicone-acrylic polymer, one or more surfactants may be added prior to or during the polymerization of the monomers, or combinations thereof. A portion of the surfactant can also be added after the polymerization. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; reactive surfactants; ethoxylated alcohols or phenols; and mixtures thereof. The amount of the surfactants used is typically in the range of from 0.1% to 6%, from 0.3% to 3%, or from 0.5% to 1.5%, by weight based on the weight of total monomers used for preparing the silicone-acrylic polymer.

After completing the polymerization of the silicone-acrylic polymer, the obtained aqueous dispersion may be optionally neutralized by one or more bases as neutralizers to a pH value, for example, at least 6, from 6 to 11, or from 7 to 9. The bases may lead to partial or complete neutralization of the ionic or latently ionic groups of the silicone-acrylic polymer. Examples of suitable bases include alkali metal or alkaline earth metal compounds such as sodium hydroxide, potassium hydroxide, calcium hydroxide, zinc oxide, magnesium oxide, sodium carbonate; primary, secondary, and tertiary amines, such as ammonia solution, triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; and mixtures thereof.

The process of preparing the aqueous dispersion of the present invention can reduce coagulum formation, for example, the coagulum content of the resultant aqueous dispersion is less than 200 ppm, less than 150 ppm, or even less than 100 ppm, after sieving with 100 mesh (149 μm) or 325 mesh (44 μm).

The silicone-acrylic polymer particles in the aqueous dispersion of the present invention may have a number average particle size in the range of from 50 to 500 nanometers (nm), from 80 to 400 nm, or from 130 to 300 nm, as determined by Brookhaven BI-90 Plus Particle Size Analyzer.

The aqueous dispersion of the present invention may further comprise a styrene-acrylic polymer that is different from the silicone-acrylic polymer described above. The styrene-acrylic polymer may comprise less than 0.1% by weight, less than 0.05%, or even zero of structural units of the (meth)acrylate functional siloxane as described above in the silicone-acrylic polymer section. The styrene-acrylic polymer may be free of structural units of the (meth)acrylate functional siloxane.

The styrene-acrylic polymer useful in the present invention may comprise one or more structural units of styrene, substituted styrene, and mixtures thereof. Suitable substituted styrene may include those described in the aqueous dispersion section above. The styrene-acrylic polymer may comprise, by weight based on the weight of the styrene-acrylic polymer, from 20% to 70%, from 25% to 65%, from 30% to 60%, or from 35% to 55%, of structural units of styrene and substituted styrene.

The styrene-acrylic polymer useful in the present invention may also comprise structural units of one or more alkyl esters of (meth)acrylic acids. The alkyl esters of (meth)acrylic acids can be $C_1$-$C_{25}$-alkyl, $C_1$-$C_{22}$-alkyl, $C_1$-$C_{12}$-alkyl, or $C_4$-$C_{10}$-alkyl esters of (meth)acrylic acids. Examples of suitable alkyl esters of (meth)acrylic acids include methyl acrylate, methyl methacrylate, ethyl acrylate, butyl acrylate, butyl methacrylate, 2-ethylhexyl acrylate, iso-butyl (meth)acrylate, hexyl (meth)acrylate, lauryl (meth)acrylate, stearyl (meth)acrylate, cyclohexyl (meth)acrylate, benzyl (meth)acrylate, oleyl (meth)acrylate, palmityl (meth) acrylate, nonyl (meth)acrylate, decyl (meth)acrylate, dodecyl (meth)acrylate, pentadecyl (meth) acrylate, hexadecyl (meth)acrylate, octadecyl (meth)acrylate, and mixtures thereof. Preferred alkyl esters of (meth)acrylic acids are selected from the group consisting of methyl methacrylate, butyl methacrylate, butyl acrylate, and 2-ethylhexyl acrylate. The styrene-acrylic polymer may comprise, by weight based on the weight of the styrene-acrylic polymer, from 30% to 80%, from 35% to 75%, from 40% to 70%, or from 45% to 65%, of structural units of the alkyl ester of (meth)acrylic acids.

The styrene-acrylic polymer useful in the present invention may comprise structural units of one or more ionic monomers. Suitable ionic monomers may include those described in the silicone-acrylic polymer section above. The styrene-acrylic polymer may comprise, by weight based on the weight of the styrene-acrylic polymer, from 0.1% to 5%, from 0.5% to 4%, from 1% to 3%, or from 1.5% to 2.5%, of structural units of the ionic monomer.

The styrene-acrylic polymer useful in the present invention may have a Tg in the range of from −20 to 50° C., from −10 to 40° C., from 0 to 35° C., or from 10 to 30° C. The styrene-acrylic polymer may have a number average molecular weight ($M_e$) in the range of from 35,000 to 500,000 g/mol, from 50,000 to 300,000 g/mol, from 60,000 to 200,000 g/mol, or from 70,000 to 150,000 g/mol, as determined according to the GPC analysis in the Examples section below.

The styrene-acrylic polymer in the aqueous dispersion of the present invention may be present in an amount of from zero to 97%, from 10% to 95%, from 20% to 93%, from 30% to 90%, from 40% to 88%, from 50% to 85%, or from 60% to 80%, by dry weight based on the total dry weight of the silicone-acrylic polymer and the styrene-acrylic polymer.

The aqueous dispersion of the present invention further comprises water, for example, in an amount of from 30% to 90% or from 40% to 80% or from 50% to 70%, by weight based on the total weight of the aqueous dispersion.

The present invention also relates to an aqueous coating composition comprising the aqueous dispersion of the present invention. Such aqueous dispersion may be present in the aqueous coating composition, by weight based on the weight of the aqueous coating composition, in an amount of from 20% to 90%, from 30% to 80%, or from 40% to 70%.

The aqueous coating composition of the present invention may further comprise pigments and/or extenders. "Pigment" herein refers to a material which is capable of materially contributing to the opacity or hiding capability of a coating. Such materials typically have a refractive index greater than 1.8. Inorganic pigments typically include metal oxides. Examples of suitable pigments include titanium dioxide ($TiO_2$), zinc oxide, iron oxide, zinc sulfide, anticorrosive pigments such as zinc phosphate and zinc molybdate, carbon black, barium sulfate, barium carbonate and mixtures thereof. $TiO_2$ typically exists in two crystal forms, anastase and rutile. Suitable commercially available $TiO_2$ may include, for example, KRONOS 2310 available from Kronos Worldwide, Inc., Ti-Pure R-706 available from Chemours (Wilmington, Del.), TiONA AT1 available from Cristal, and mixtures thereof. $TiO_2$ may be also available in concentrated dispersion form. "Extender" herein refers to a particulate inorganic material having a refractive index of less than or equal to 1.8 and greater than 1.3. Examples of suitable extenders include calcium carbonate, clay, calcium sulfate, aluminum silicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), and mixtures thereof. The aqueous coating composition may have a pigment volume concentration (PVC) of from 0% to 55%, from 5% to 40%, or from 10% to 35%. PVC may be determined according to the following equation:

$$PVC = \frac{\text{Volume of Pigment and extender}}{\text{Dry volume of the coating composition}} \times 100\%$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates and mixtures thereof. Suitable commercially available defoamers may include, for example, TEGO Airex 902 W and TEGO Foamex 1488 polyether siloxane copolymer emulsions both available from TEGO, BYK-024 silicone deformer available from BYK, and mixtures thereof. The defoamer may be present, by weight based on the total weight of the aqueous coating composition, generally in an amount of from zero to 5%, from 0.05% to 3%, or from 0.1% to 2%.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is HEUR. The thickener may be present, by weight based on the total weight of the aqueous coating composition, in an amount of from zero to 5%, from 0.05% to 3%, or from 0.1% to 1%.

The aqueous coating composition of the present invention may further comprise one or more wetting agents. "Wetting agents" herein refer to chemical additives that reduce the surface tension of a coating composition, causing the coating composition to be more easily spread across or penetrate the surface of a substrate. Wetting agents may be polycarboxylates, anionic, zwitterionic, or non-ionic. Suitable commercially available wetting agents may include, for example, SURFYNOL 104 nonionic wetting agent based on an actacetylenic diol available from Evonik, BYK-346 and BYK-349 polyether-modified siloxanes both available from BYK, or mixtures thereof. The wetting agent may be present, by weight based on the total weight of the aqueous coating composition, from zero to 5%, from 0.05% to 3%, or from 0.1% to 2%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescents may be present, by weight based on the total weight of the aqueous coating composition, from zero to 10%, from 0.5% to 8%, or from 2% to 5%.

The aqueous coating composition of the present invention may further comprise one or more dispersants. The dispersant can be polyacrylic acid or polymethacrylic acid or maleic anhydride with various monomers such as styrene, acrylate or methacrylate esters, diisobutylene, and other hydrophilic or hydrophobic comonomers; salts of thereof; and mixtures thereof. The dispersant may be present, by weight based on the total weight of the aqueous coating composition, in an amount of from zero to 5%, from 0.05% to 3%, or from 0.1% to 1%.

In addition to the components described above, the aqueous coating composition of the present invention may further comprise any one or combination of the following additives: buffers, neutralizers, humectants, mildewcides, biocides, anti-skinning agents, colorants, flowing agents, anti-oxidants, plasticizers, leveling agents, adhesion promoters, anti-flash rust additives, and grind vehicles. These additives may be present in a combined amount of from zero to 10% or from 0.1% to 2%, by weight based on the total weight of the aqueous coating composition. The aqueous coating composition may also comprise water in an amount of from 30% to 90%, from 40% to 80%, or from 50% to 70% by weight of the aqueous coating composition.

The aqueous coating composition of the present invention may be prepared by a process comprising: admixing the silicone-acrylic polymer, optionally the styrene-acrylic polymer, and other optional components, e.g., pigments and/or extenders as described above. Components in the aqueous coating composition may be mixed in any order to provide the aqueous coating composition of the present invention. Any of the above-mentioned optional components may also be added to the composition during or prior to the mixing to form the aqueous coating composition. When the aqueous coating composition comprises pigment and/or extender, the pigments and/or extenders are preferably mixed with the dispersant to form a slurry of pigments and/or extender.

The aqueous coating composition of the present invention can provide coatings made therefrom with improved corrosion resistance. The present invention also provides a method of improving corrosion resistance of a corrosion susceptible substrate, such as metal. The method comprises: providing the aqueous coating composition of the present invention, applying the aqueous coating composition to a metal substrate, and drying, or allowing to dry, the aqueous coating composition to form a coating. Improved corrosion resistance means surface rusted rating >5 and blister rating of M or better for a coating with a thickness of 40-80 μm after exposure to salt spray for at least 48 hours, at least 240 hours, or at least 340 hours, according to the test method described in the Examples section.

The present invention also relates to a process of using the aqueous coating composition of the present invention. The process may comprise: applying the coating composition to a substrate, and drying, or allowing to dry, the applied coating composition. The present invention also provides a method of preparing a coating. The method may comprise forming the aqueous coating composition of the present invention, applying the aqueous coating composition to a substrate, and drying, or allowing to dry, the applied coating composition to form the coating.

The aqueous coating composition of the present invention can be applied to, and adhered to, various substrates. Examples of suitable substrates include wood, metals, plastics, foams, stones, elastomeric substrates, glass, fabrics, concrete, or cementitious substrates. The aqueous coating composition, preferably comprising the pigment, is suitable for various applications such as marine protective coatings, general industrial finishes, metal protective coatings, automotive coatings, traffic paint, Exterior Insulation and Finish Systems (EIFS), wood coatings, coil coatings, plastic coatings, can coatings, architectural coatings, and civil engineering coatings. The aqueous coating composition is particularly suitable for metal protective coatings. The aqueous coating composition can be used as a primer, a topcoat, as one-coat direct-to-metal coating, or in combination with other coatings to form multi-layer coatings.

The aqueous coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition of the present invention has been applied to a substrate, the aqueous coating composition can dry, or allow to dry, to form a film (this is, coating) at room temperature (20-35° C.), or at an elevated temperature, for example, from 35 to 240° C.

EXAMPLES

Some embodiments of the invention will now be described in the following Examples, wherein all parts and percentages are by weight unless otherwise specified.

The following monomers are used in the examples: Methyl methacrylate (MMA), butyl acrylate (BA), methacrylic acid (MAA) and phosphate ethyl acrylate (PEM).

n-Dodecyl mercaptan (n-DDM) and methyl 3-Mercaptopropionate (MMP) are both available from Sinopharm Group Co. Ltd.

Styrene-acrylic latex, available from The Dow Chemical Company, comprises a polymer comprising, by weight based on the weight of the polymer, about 56% of styrene and about 44% of alkyl (meth)acrylates.

Methacrylate functional siloxane ("MFS"), available from The Dow Chemical Company, has the structure of

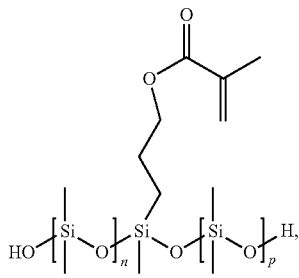

wherein n+p is about 25.

OROTAN™ 681 dispersant, available from The Dow Chemical Company, is a hydrophobic acrylic copolymer pigment dispersant.

SURFYNOL TG nonionic wetting agent and TEGO AIREX 902W defoamer (an emulsion of a polyether siloxane copolymer, containing fumed silica) are both available from Evonik.

Ti-Pure R-706 pigment, available from Chemours, is a titanium dioxide pigment.

TRITON™ HW-1000 Surfactant, available from The Dow Chemical Company, is a hydrocarbon based wetting surfactant.

Sodium nitrite (15%) is used as an anti-flash rust additive.

ACRYSOL™ RM-8W rheology modifier, available from The Dow Chemical Company, is a nonionic urethane rheology modifier.

TEXANOL ester alcohol, available from Eastman, is used as a coalescent.

OROTAN, TRITON and ACRYSOL are all trademarks of The Dow Chemical Company.

The following standard analytical equipment and methods are used in the Examples.

GPC Analysis

GPC analysis was performed generally by Agilent 1200. A sample was dissolved in tetrahydrofuran (THF)/formic acid (FA) (5%) with a concentration of 2 mg/mL and then filtered through 0.45 μm polytetrafluoroethylene (PTFE) filter prior to GPC analysis. The GPC analysis is conducted using the following conditions:

Column: One PLgel GUARD columns (10 μm, 50 mm×7.5 mm), Two Mixed B columns (7.8 mm×300 mm) in tandem; column temperature: 40° C.; mobile phase: THF/FA (5%); flow rate: 1.0 mL/minute; Injection volume: 100 μL; detector: Agilent Refractive Index detector, 40° C.; and calibration curve: PL Polystyrene I Narrow standards with molecular weights ranging from 2329000 to 580 g/mol, using polynom 3 fitness.

Coagulum Content of Aqueous Dispersion

An aqueous dispersion was filtered through 100 mesh and 325 mesh sieves, respectively. The residue remaining on each sieve was washed with water, respectively, and put in an oven at 150° C. for 20 minutes. Coagulum content is determined by the dry weight of the residue on each sieve divided by the original wet weight of the aqueous dispersion. The acceptable coagulum content is <200 ppm when sieving with 100 mesh and 325 mesh, respectively. The lower the coagulum content, the more stable polymerization process in preparing the aqueous dispersion.

Salt Spray Resistance Test

A coating composition was applied onto Q panels (cold rolled steel) by a 150 μm applicator. The resultant film was then allowed to dry at 23° C. and relative humidity (RH) of 50% for 7 days. Salt spray resistance properties were tested by exposure of the as prepared coated panels to a salt spray environment (5% sodium chloride fog) in accordance with ASTM B-117 (2011). Exposed cold rolled steel was covered with tape (3M plastic tape #471) prior to exposure. A scribe mark made with a razor blade was scratched into the bottom half of the panels obtained above immediately before exposure. The panels were exposed to the salt spray environment for certain hours, and then moved from the salt spray environment to rate blister and rust. The results were presented as blister/rust ratings.

Blister ratings were conducted in accordance with ASTM D714-02 (2010) and comprised a number and/or one or more letters, as shown in Table A. The letter F, M, MD or D is a qualitative representation of the density of blisters. The number refers to the size of the blister, whereby 2 is the largest size, 8 is the smallest size, and 10 is no blister. The bigger the number, the smaller the size of blister. Rust ratings are determined by ASTM D610-2001, as shown in Tables B and C. The panels with blister rating of M or better and surface rusted rating >5 indicate good corrosion resistance of coatings.

TABLE A

| Blister rating criteria | | | |
|---|---|---|---|
| Density of blister | Abbreviation | Size of Blister | Rating |
| Few | F | Very Big blister | 2 |
| Medium | M | Big blister | 4 |
| Medium dense | MD | Small to middle blister | 6 |
| Dense | D | Smallest blister seen by unaided eye | 8 |
| | | No blister | 10 |

TABLE B

Rust Rating by rusting degree

| Rusting degree | Rating |
| --- | --- |
| Spots | S |
| General | G |
| Pin point | P |

TABLE C

Rust Rating by surface rusted percentage

| Surface Rusted | Rating |
| --- | --- |
| Less than or equal to 0.01 percent | 10 |
| Greater than 0.01 percent and up to 0.03 percent | 9 |
| Greater than 0.03 percent and up to 0.1 percent | 8 |
| Greater than 0.1 percent and up to 0.3 percent | 7 |
| Greater than 0.3 percent and up to 1.0 percent | 6 |
| Greater than 1.0 percent and up to 3.0 percent | 5 |
| Greater than 3.0 percent and up to 10.0 percent | 4 |
| Greater than 10.0 percent and up to 16.0 percent | 3 |
| Greater than 16.0 percent and up to 33.0 percent | 2 |
| Greater than 33.0 percent and up to 50.0 percent | 1 |
| Greater than 50.0 percent | 0 |

Example (Ex) 1

To 273.75 gram (g) of deionized (DI) water, was added 15.75 g of DISPONIL SLS 103 lauryl sodium sulfate salt surfactant (BASF Chemicals) (28%), 1187.92 g of MMA, 556.65 g of BA, 23.1 g of MAA, 17.80 g of MFS, and 22.35 g of n-DDM were mixed together to produce a stable monomer mixture emulsion.

To DI water (548.25 g) under nitrogen atmosphere at 90° C., was added SLS Surfactant (28%) (18.68 g), ammonium bicarbonate (100%, 9.45 g) in DI water (82.50 g), 84 g of the monomer mixture and ammonium persulfate (APS) (7.84 g) in DI water (26.25 g) followed by DI water (3.75 g) to form a reaction mixture. The remaining monomer mixture was then added at 88° C. over 90 minutes followed by DI water (22.50 g). At the end of polymerization, FeSO$_4$ (0.0041 g) in DI water (15.75 g) mixed with ethylenediamine tetraacetic acid (0.0075 g) in DI water (15.75 g), a solution of t-butyl hydroperoxide (70%, 0.22 g) in DI water (15.75 g) and a solution of isoascorbic acid (0.08 g) in DI water (15.75 g), a solution of t-butyl hydroperoxide (1.26 g) in DI water (11.25 g) and a solution of isoascorbic acid (0.42 g) in DI water (13.50 g) were all added at 60° C., then ammonia (25%, 16.65 g) in DI water (16.65 g) were added at 50° C., to obtain the aqueous polymer dispersion.

Exs 2-4

Aqueous polymer dispersions of Exs 2-4 were prepared, respectively, according to the same procedure as described above for preparing the aqueous polymer dispersion of Ex 1 above, based on monomer formulations and the dosage of n-DDM as given in Table 1.

Comparative (Comp) Exs A-E

These aqueous polymer dispersions were prepared, respectively, according to the same procedure as described above for preparing the aqueous polymer dispersion of Ex 1 above, based on monomer formulations and the dosage of n-DDM or MMP, if used, given in Table 1.

Properties of the obtained aqueous polymer dispersions are given in Table 2.

TABLE 1

Polymer Compositions

| | Composition* | MFS/n-DDM (or MMP)** |
| --- | --- | --- |
| Comp Ex A | 67.2MMA/31.5BA/1.3MAA//1.25n-DDM | 0 |
| Comp Ex B | 66.6MMA/31.1BA/1.3MAA/1MFS | / |
| Comp Ex C | 61.1MMA/28.6BA/1.3MAA/9MFS//1.25n-DDM | 7.2 |
| Comp Ex D | 65.2MMA/30.5BA/1.3MAA/3MFS//0.74MMP | 4.1 |
| Comp Ex E | 36.4MMA/55.4BA/3.2PEM/5MFS//1n-DDM | 5 |
| Ex 1 | 66.6MMA/31.1BA/1.3MAA/1MFS//1.25n-DDM | 0.8 |
| Ex 2 | 65.2MMA/30.5BA/1.3MAA/3MFS//1.25n-DDM | 2.4 |
| Ex 3 | 63.2MMA/29.5BA/1.3MAA/6MFS//1.25n-DDM | 4.8 |
| Ex 4 | 36.4MMA/55.4BA/3.2PEM/5MFS//2n-DDM | 2.5 |

*% by weight based on the total weight of monomers;
**weight ratio.

TABLE 2

Properties of aqueous polymer dispersion

| | pH | Solids (%) | Particle size[1] (nm) | Viscosity[2] (centipoise) | Coagulum content (ppm) 100 mesh | Coagulum content (ppm) 325 mesh | Mn[3] | Mw[3] |
| --- | --- | --- | --- | --- | --- | --- | --- | --- |
| Comp Ex A | 9.12 | 53.49 | 161 | 241 | <10 | <10 | 11,798 | 30,920 |
| Comp Ex B | 9.18 | 52.93 | 166 | 145 | >3000 | 329 | | |
| Comp Ex C | 8.97 | 51.37 | 154 | 135 | >1000 | >2000 | | |
| Comp Ex D | 9.3 | 50.31 | 214 | 161 | >2000 | NA | | |
| Comp Ex E | 9.0 | 50.5 | 162 | 142 | >6000 | NA | | |
| Ex 1 | 9.04 | 53.38 | 230 | 164 | 73 | <10 | 11,112 | 29,983 |
| Ex 2 | 9.19 | 52.88 | 163 | 162 | 56 | <10 | 9,976 | 27,197 |
| Ex 3 | 8.98 | 52.93 | 155 | 157 | 56 | 80 | 11,444 | 30,414 |
| Ex 4 | 9.0 | 50.6 | 159 | 142 | 65 | NA | | |

[1]Particle size refers to the number average particle size measured by Brookhaven BI-90 Plus Particle Size Analyzer;
[2]Viscosity measured by Brookfield viscometer DV-I Primer (60 rpm, spindle #2); and
[3]$M_n$ and Mw (weight average molecular weight) obtained by the GPC analysis described above.

As shown in Table 1, the combination of the specific chain transfer agent such as n-DDM and the methacrylate functional siloxane at specific ratios (Exs 1-4) contributed to stable polymerization process with significantly reduced coagulum contents as compared to polymerization processes for preparing aqueous polymer dispersions of Comp Exs B-E.

Coating Compositions

Each aqueous dispersions prepared above (binder 1), or its combination with styrene-acrylic latex (binder 2), were used as the binder in preparing coating compositions, based on formulations described in Table 3. The ingredients in the grind were mixed using a high speed disperser (mixing speed: 800-1800 revolutions per minute (rpm)). Then the obtained grind was mixed with the binder with a conventional lab mixer (mixing speed: 50-600 rpm). Then other ingredients in the letdown were added to obtain the coating compositions.

The obtained coating compositions were evaluated according to the salt spray resistance test method described above and results of the properties are shown in Tables 3 and 4.

As shown in Table 3, Paints 1 and 2 comprising the aqueous dispersions of the present invention provided much better salt spray resistance (SSR) as compared to Paint A.

TABLE 3

Paint formulations and salt spray resistance properties

| gram | Paint A | Paint 1 | Paint 2 |
|---|---|---|---|
| Grind | | | |
| Water | 42.00 | 42.00 | 42.00 |
| OROTAN 681 | 7.80 | 7.80 | 7.80 |
| SURFYNOL TG | 1.99 | 1.99 | 1.99 |
| Aqueous ammonia (28%) | 1.99 | 1.99 | 1.99 |
| TEGO Airex 902W | 0.46 | 0.46 | 0.46 |
| Ti-Pure R-706 | 209.24 | 209.24 | 209.24 |
| HW-1000 | 10.00 | 10.00 | 10.00 |
| Water | 42.00 | 42.00 | 42.00 |
| Subtotal | 315.48 | 315.48 | 315.48 |
| Letdown | | | |
| Binder 1 Comp Ex A | 480.91 | | |
| Ex 2 | | 480.91 | |
| Ex 3 | | | 480.91 |
| Water | 198.43 | 198.43 | 198.43 |
| Aqueous ammonia (28%) | 4.00 | 4.00 | 4.00 |
| Sodium nitrite (15%) | 8.97 | 8.97 | 8.97 |
| ACRYSOL RM-8W | 2.10 | 2.10 | 2.10 |
| Texanol | 63.00 | 63.00 | 63.00 |
| Total | 1072.89 | 1072.89 | 1072.89 |
| Properties | | | |
| SSR (45-60 μm DFT, after 48 h) (rust/blister) | 5P/4M | 8S/4F | 7G/10 |

*DFT refers to dry film thickness

As shown in Table 4, Paints 3-7 comprising the combination of the silicone-acrylic polymer with the styrene-acrylic polymer as the binders demonstrated better salt spray resistance than Paint B comprising only the styrene-acrylic polymer or Paint C comprising the aqueous dispersion of Comp Ex A.

TABLE 4

Paint formulations and salt spray resistance properties

| | gram | | | | | | |
|---|---|---|---|---|---|---|---|
| | Paint B | Paint C | Paint 3 | Paint 4 | Paint 5 | Paint 6 | Paint 7 |
| Grind | | | | | | | |
| Water | 42.00 | 42.00 | 42.00 | 42.00 | 42.00 | 42.00 | 42.00 |
| OROTAN 681 | 7.80 | 7.80 | 7.80 | 7.80 | 7.80 | 7.80 | 7.80 |
| SURFYNOL TG | 1.99 | 1.99 | 1.99 | 1.99 | 1.99 | 1.99 | 1.99 |
| Aqueous ammonia (28%) | 1.99 | 1.99 | 1.99 | 1.99 | 1.99 | 1.99 | 1.99 |
| TEGO Airex 902W | 0.46 | 0.46 | 0.46 | 0.46 | 0.46 | 0.46 | 0.46 |
| Ti-Pure R-706 | 209.24 | 209.24 | 209.24 | 209.24 | 209.24 | 209.24 | 209.24 |
| HW-1000 Water | 42 | 42 | 42 | 42 | 42 | 42 | 42 |
| Subtotal | 305.48 | 305.48 | 305.48 | 305.48 | 305.48 | 305.48 | 305.48 |
| Letdown | | | | | | | |
| Binder 2 Styrene-acrylic latex | 536.60 | 429.28 | 429.28 | 429.28 | 429.28 | 482.94 | 375.62 |
| Binder 1 Comp Ex A | | 96.18 | | | | | |
| Ex 1 | | | 96.18 | | | | |
| Ex 2 | | | | 96.18 | | 48.07 | 144.27 |
| Ex 3 | | | | | 96.18 | | |
| Water | 95.27 | 103.22 | 103.22 | 103.22 | 103.22 | 100.47 | 105.98 |
| Aqueous ammonia (28%) | 4.00 | 4.00 | 4.00 | 4.00 | 4.00 | 4.00 | 4.00 |
| Sodium Nitrite (15%) | 8.97 | 8.97 | 8.97 | 8.97 | 8.97 | 8.97 | 8.97 |
| ACRYSOL RM-8W | 2.10 | 2.10 | 2.10 | 2.10 | 2.10 | 2.10 | 2.10 |
| Texanol | 38.09 | 41.28 | 41.28 | 41.28 | 41.28 | 38.48 | 44.09 |
| Total | 990.51 | 990.51 | 990.51 | 990.51 | 990.51 | 990.51 | 990.51 |
| Properties | | | | | | | |
| SSR (70-80 μm DFT, after 340 h) (rust/blister) | 5S/6D | 3G/4D | 7S/4M | 9S/4F | 7S/4M | 8S/4F | 8S/2F |

What is claimed is:

1. An aqueous dispersion comprising a silicone-acrylic polymer with a number average molecular weight of from 5,000 to 50,000 g/mol, wherein the silicone-acrylic polymer comprises, based on the weight of the silicone-acrylic polymer,
(a) from 0.1% to 6.5% by weight of structural units of a (meth)acrylate functional siloxane having the structure of formula (I),

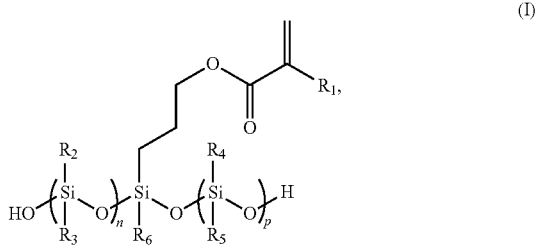

wherein $R_1$ is hydrogen or a methyl group, $R_2$, $R_3$, $R_4$, $R_5$ and $R_6$ are each independently selected from the group consisting of methyl, ethyl and benzyl groups, n is an integer of from 0 to 20, p is an integer of from 0 to 20, provided that n+p>5;
(b) from 0.1% to 4.5% by weight of structural units of an ionic monomer;
(c) from 30% to 75% by weight of structural units of a hard monomer; and
(d) from 20% to 65% by weight of structural units of a soft monomer;
wherein the silicone-acrylic polymer comprises residues of an alkyl thiol containing a $C_6$-$C_{24}$ alkyl or a substituted $C_6$-$C_{24}$ alkyl; and
wherein the weight ratio of structural units of the (meth) acrylate functional siloxane to residues of the alkyl thiol is less than 5.0.

2. The aqueous dispersion of claim 1, wherein the alkyl thiol is selected from the group consisting of n-dodecyl mercaptan, cetyl mercaptan, octadecanethiol, octyl mercaptan, hexanethiol, and decanethiol.

3. The aqueous dispersion of claim 1, wherein the (meth) acrylate functional siloxane has the structure of formula (I), wherein n and p are each independently in the range of from 7 to 16.

4. The aqueous dispersion of claim 1, wherein the weight ratio of structural units of the (meth)acrylate functional siloxane to residues of the alkyl thiol is 3.0 or less.

5. The aqueous dispersion of claim 1, wherein the silicone-acrylic polymer comprises, based on the weight of the silicone-acrylic polymer, from 0.1% to 3% by weight of structural units of the (meth)acrylate functional siloxane.

6. The aqueous dispersion of claim 1, wherein the ionic monomer is selected from the group consisting of acrylic acid, methyl acrylic acid, crotonic acid, itaconic acid, maleic acid, fumaric acid, and phosphoethyl (meth)acrylate; and salts thereof.

7. The aqueous dispersion of claim 1, wherein the soft monomer is selected from the group consisting of ethyl acrylate, butyl acrylate, butyl methacrylate, 2-ethylhexylacrylate, 2-ethylhexyl methacrylate, lauryl acrylate and lauryl methacrylate.

8. The aqueous dispersion of claim 1, wherein the hard monomer is selected from the group consisting of methyl methacrylate, styrene, cyclohexyl methacrylate, tert-butyl methacrylate and cyclohexyl acrylate.

9. The aqueous dispersion of claim 1, wherein the silicone-acrylic polymer has a number average molecular weight of from 8,000 to 20,000 g/mol.

10. The aqueous dispersion of claim 1, wherein the silicone-acrylic polymer has a glass transition temperature of from −20 to 50° C.

11. The aqueous dispersion of claim 1, wherein the silicone-acrylic polymer comprises, based on the weight of the silicone-acrylic polymer,
from 1% to 3% by weight of structural units of the (meth)acrylate functional siloxane having the structure of formula (I), from 1% to 3.5% by weight of structural units of the ionic monomer, from 35% to 70% by weight of structural units of the hard monomer, and from 25% to 60% by weight of structural units of the soft monomer,
wherein the weight ratio of structural units of the (meth) acrylate functional siloxane to residues of the alkyl thiol is 3.5 or less.

12. The aqueous dispersion of claim 1, further comprising a styrene-acrylic polymer.

13. An aqueous coating composition comprising the aqueous dispersion of claim 1.

14. A process of preparing an aqueous dispersion comprising a silicone-acrylic polymer with a number average molecular weight of from 5,000 to 50,000 g/mol by free-radical polymerization, comprising: polymerization of a monomer mixture in an aqueous medium in the presence of an alkyl thiol containing a $C_6$-$C_{24}$ alkyl group or a substituted $C_6$-$C_{24}$ alkyl group;
wherein the monomer mixture comprises, based on the total weight of the monomer mixture,
(a) from 0.1% to 6.5% by weight of a (meth)acrylate functional siloxane having the structure of formula (I),

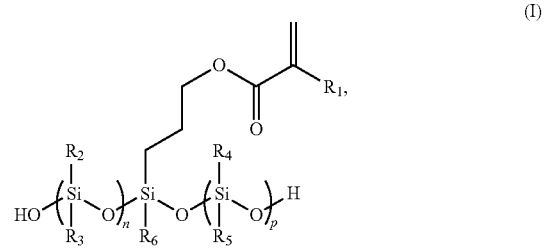

wherein $R_1$ is hydrogen or a methyl group, $R_2$, $R_3$, $R_4$, $R_5$ and $R_6$ are each independently selected from the group consisting of methyl, ethyl and benzyl groups, n is an integer in the range of from 0 to 20, p is an integer in the range of from 0 to 20, provided that n+p>5;
(b) from 0.1% to 4.5% by weight of an ionic monomer;
(c) from 30% to 75% by weight of a hard monomer; and
(d) from 20% to 65% by weight of a soft monomer;
wherein the silicone-acrylic polymer comprises residues of the alkyl thiol; and
wherein the weight ratio of structural units of the (meth) acrylate functional siloxane to residues of the alkyl thiol is less than 5.0.

* * * * *